United States Patent
Pyle et al.

(10) Patent No.: US 7,209,167 B2
(45) Date of Patent: Apr. 24, 2007

(54) METHOD AND APPARATUS FOR CAPTURE OF SENSORY DATA IN ASSOCIATION WITH IMAGE DATA

(75) Inventors: Norman C. Pyle, Greeley, CO (US); Miles K. Thorland, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 10/342,586

(22) Filed: Jan. 15, 2003

(65) Prior Publication Data

US 2004/0135900 A1    Jul. 15, 2004

(51) Int. Cl.
*H04N 5/76*    (2006.01)
(52) U.S. Cl. .................................................. 348/231.4
(58) Field of Classification Search ...................... None
See application file for complete search history.

(56) References Cited

U.S. PATENT DOCUMENTS

| | | | |
|---|---|---|---|
| 5,521,638 A | 5/1996 | Dezaki et al. | |
| 5,809,344 A | 9/1998 | Ishida et al. | |
| 5,815,201 A | 9/1998 | Hashimoto et al. | |
| 6,031,964 A | 2/2000 | Anderson | |
| 6,072,645 A | 6/2000 | Sprague | |
| 6,111,609 A * | 8/2000 | Stevens | 348/372 |
| 6,128,037 A | 10/2000 | Anderson | |
| 6,374,054 B1 | 4/2002 | Schinner | |
| 6,393,216 B1 | 5/2002 | Ootsuka et al. | |
| 6,411,331 B1 | 6/2002 | Sansom-Wai et al. | |
| 7,106,369 B2 * | 9/2006 | Baron | 348/231.4 |
| 7,173,655 B2 * | 2/2007 | Thorland et al. | 348/231.4 |
| 2003/0174218 A1* | 9/2003 | Battles et al. | 348/231.4 |
| 2004/0041922 A1* | 3/2004 | Norcross | 348/231.4 |
| 2005/0146623 A1* | 7/2005 | Juen | 348/220.1 |

* cited by examiner

*Primary Examiner*—Ngoc-Yen Vu
*Assistant Examiner*—Dillon Durnford-Geszvain

(57) ABSTRACT

Method and apparatus for capturing a variable length of sensory data in association with still image data. Manipulation of the camera is detected prior to image-capture, and sensory data are generated in response to detecting the manipulation. The sensory data are stored in temporary storage. When a control signal to capture a still image is active, still image data are generated and stored in non-volatile storage. A subset of the sensory data in temporary storage is selected and stored in non-volatile storage in association with the still image data.

27 Claims, 3 Drawing Sheets

METHOD AND APPARATUS FOR CAPTURE OF SENSORY DATA IN ASSOCIATION WITH IMAGE DATA

BACKGROUND

Capturing audio data along with still images is a way of bringing "life" to a still image. The captured audio data is saved along with the captured image, and may be replayed when the image is viewed. Conventionally, the initiation of audio capture is an activity that is manually triggered by a user. For example, a user manually triggers a period of audio recording by pressing a button in anticipation of also initiating an image-capture operation. Some still cameras utilize a first position on a shutter-release button to initiate audio capture and/or focusing. Other digital still cameras provide a manual audio record button distinct from the shutter button. Manually depressing the audio record button after capturing an image provides the ability to subsequently annotate an image with a verbal narration.

Some conventional digital cameras typically provide the capability to capture audio data for some pre-set, fixed duration determined with reference to a manually initiated trigger. For example, an audio record feature may only record for 5 seconds from the time a manual audio record button is activated. Thus, the length of the pre-set recording duration affects whether the captured audio data are useful. If the pre-set duration of the recording period is too long, the captured audio data are likely to include a substantial portion of undesirable sound; if too short, there may be sounds occurring outside the pre-set duration that a user would like to associate with the still image. Requiring the user to initiate audio data recording in close coordination with image capture also ignores the fact that the user cannot predict the timing of the desired audio data. For example, the desirable audio data may occur prior to or contemporaneous with the capture of a still image. Thus, if audio data are captured beginning only after the image has been captured, the desired audio will already have passed and go uncaptured.

Therefore, manual coordination imposed upon a user between the predetermined audio recording period and still image capture is a constraint upon the user as to the time within which a picture must be taken. In other words, the user is limited to capturing an image during the audio recording period in order to obtain the best coordination between picture and sound.

SUMMARY

In one embodiment, the invention provides a method and apparatus for capturing a sensory data in association with image data. Manipulation of the camera is detected prior to image-capture, and sensory data are generated in response to detecting the manipulation. The sensory data are stored in temporary storage. When a control signal to capture a still image is active, still image data are generated and stored in non-volatile storage. A subset of the sensory data in temporary storage is selected and stored in non-volatile storage in association with the still image data.

DETAILED DESCRIPTION

In various embodiments of the present invention, sensory data, such as audio, video, or other sensory data, are captured in association with a digital still image. The camera captures sensory data, automatically commencing with an event indicative of an image being composed for capture, and stores a selected portion of the sensory data in association with the still image. Various user actions associated with composing an image may trigger recording of the sensory data. For example, actions such as focusing, focal length adjustments of a telephoto or macro lens, and moving the camera's viewfinder close to the user's eye may be used to trigger the recording. The latest-in-time sensory data is temporarily saved for editing by the user. The user may have the option of saving a subset of the temporary sensory data other than the subset selected by the camera. For example, while the camera may automatically suggest saving the subset of sensory data centered in time about the moment of image capture, the user may select an entirely different portion of the temporarily-saved sensory data or even the entire length of temporarily-saved sensory data.

Figure 1:
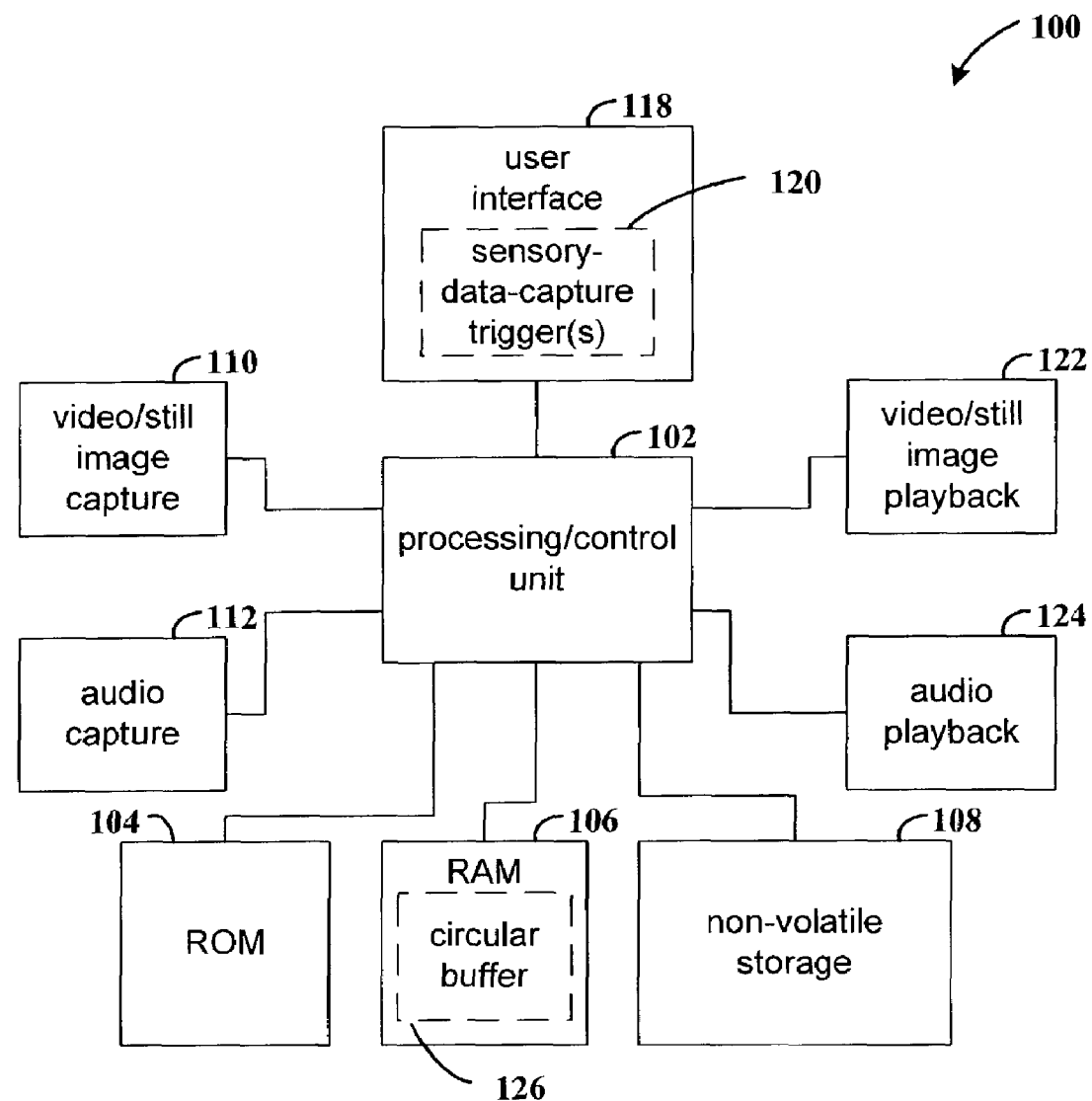
FIG. 1 is a functional block diagram of an example digital still camera in accordance with an example embodiment of the invention.

FIG. 1 is a functional block diagram of an example digital still camera 100. Those skilled in the art will appreciate that digital camera 100 illustrates but one example of components comprising a digital camera and that alternative digital camera architectures could be adapted to operate in accordance with various embodiments of the present invention.

Central to operation of the digital camera is the processing/control unit 102. The processing/control unit typically controls most functions of the camera and is coupled to all the other functional units of the camera. The processor/control unit executes a set of control programs that are stored in an internal memory device, such as the ROM 104. The processor/control unit controls storage and manipulation of raw image data, and raw sensory data (e.g., audio, video, other physical data) in the RAM 106. The raw video data may be converted to a compressed form, for example, MPEG or another video data format, and stored in non-volatile storage 108. The raw image data may be converted to a compressed form, for example, JPEG, and the processed image data are stored in non-volatile storage 108. The raw audio data may be converted to a standard format such as a WAV file, and the processed audio data are stored in non-volatile storage 108. Similarly, other raw physical data may be processed, compressed, or otherwise converted into a convenient format prior to storage in RAM 106 or non-volatile storage 108. In one embodiment, non-volatile storage is a removable flash memory card or stick. Those skilled in the art will recognize other suitable media for non-volatile storage.

The connections shown in FIG. 1 illustrate both data and control lines. While direct connections are shown, those skilled in the art will appreciate that some of the connections may be buffered or indirect. In addition, there are some connections between components that are not illustrated. For example, the video/still image capture 110 and audio capture 112 sections are coupled to the RAM 106 with control provided by the processing unit.

Video/still image capture section 110 includes a lens arrangement (not shown) that facilitates directing light to a photosensitive plane of a charge coupled device (CCD) or a CMOS sensor. An optical viewfinder enables a user to view a framed image, and an aperture is controlled by the processing/control unit to facilitate transmission of the proper amount of light to assure proper image formation. While not shown, it will be appreciated that the video/still image capture section includes circuitry for converting signals from the CCD or CMOS sensor into frames of video data. In an example embodiment, when the user initiates capture of a still image the camera saves a high-resolution frame of image data. The still image is typically high-resolution relative to the frames of video data being capture at the time of still image capture. In capturing frames of video data, the camera typically discards some of the pixel data in each frame. When the still image is captured, all of the pixel data in the corresponding frame of video data are typically saved as the still image data.

Audio capture section 112 may include a microphone (not shown) and a suitable A/D converter (not shown) for converting the analog signal from the microphone to raw digital audio data. The audio capture section 112 is but one embodiment of a sensory data capturing apparatus contemplated as a component of the present invention, and represented by audio capture section 112. Apparatus for capturing other types of sensory data may be included as part of audio capture section 112 in addition to, or in lieu of, audio capture features. For example, the camera location as determined by global positioning system signals, time stamping from satellite signals, broadcast radio or television signal data, physical environmental measurements such as temperature, pressure, light, distance to subject or other sensible quantities may be captured by the sensory capture portions of the digital camera represented by section 112.

The digital camera further includes a user interface 118 for input of user control sequences and output of data to the user. Example control switches include power on/off, mode selection switch, zoom in/out switch, live view, and shutter actuation. In addition, a LCD unit or other display may be included to enable the user to view images in either a live view mode of operation or in a review mode of operation relative to still images and video data previously stored in the non-volatile storage. Certain sensory data may also be presented through the display, for example, location coordinates or time stamping may be imposed upon the still or video image(s). In accordance with one embodiment of the invention, a control program executed by the processing/control unit 102 associates respective sets of sensory data with captured still images.

One or more sensory-data-capture triggers 120 are associated with selected ones of the user controls of the user interface 118. That is, one or more user-controllable functions that support composing an image also trigger capture of the sensory data. When the user activates, selects, or controls one of these functions, capture of sensory data automatically commences. Camera functions associated with composing an image include, but are not limited to, framing the picture (telephoto operations), powering up the camera, opening a lens cover, activating a display (e.g., the viewfinder or LCD display), placing the camera viewfinder in close proximity to the user's eye (i.e., eye detection), adjusting camera settings such as focus, zoom, aperture setting, shutter speed, program mode. Program modes may encompass many features such as full program mode, aperture priority mode, shutter priority mode, depth of field mode, sports mode, portrait mode, landscape mode and many others. In each mode, the camera automatically selects one or more camera settings, e.g., shutter speed and/or aperture, based on the program.

The video/still image playback 122 and audio playback 124 sections include circuitry for converting the video/still image and audio data to analog signals for output to the user. As explained above, the video and image signals are output via the display unit (e.g., an LCD; not shown) or to a connector for connection to another device such as an NTSC/PAL compatible device. The audio signal may be output by built-in speaker (not shown) and as part of the NTSC/PAL signal or the like.

The capture of sensory data begins automatically at some user-selectable start time, $t_s$, from the occurrence of an initiating event, where $t_s$ is equal to or greater than zero. For example, capture of sensory data may be set to begin immediately upon the occurrence of the initiating event (i.e., $t_s=0$). Alternatively, the capture of sensory data can be delayed for time $t_s$ after the initiating event (i.e., $t_s>0$). Similarly, the capture of sensory data ends at some user-selectable end time, $t_e$, from either the occurrence of an image capture operation, or the initiating event, where $t_e$ is also equal to or greater than zero. For example, capture of sensory data may be set by the user to commence automatically at the initiating event, and end some time, $t_E$, after a picture is taken; or may be user set to commence automatically at the initiating event and end when a picture is taken; or may be set by the user to commence automatically when the picture is taken, and end some time, $t_E$, after a picture is taken. The termination of sensory data capture may also be set to end some time, $t_E$, after the initiating event. For example, capture of sensory data may be user set to commence automatically at the initiating event, and end either (1) some time, $t_{E1}$, after the initiating event contingent on no picture being taken within $t_{E1}$; or (2) some time, $t_{E2}$, after a picture is taken. Those having ordinary skill in the art will recognize that various combinations of the user-selectable start time referenced to the initiating event and end time referenced to either the initiating or image capture event are sufficient to place the capturing period anywhere in time following the initiating event and control the capture period's duration. Different start times and end times may be programmed by a user for the different camera functions that trigger capture of the sensory data.

Sensory data captured over time is temporarily stored in circular buffer 126. The circular buffer is sized to provide sufficient storage for storing captured sensory data for a period $t_B$. If sensory data are captured for a period of time longer than $t_B$, sensory data captured later in time is written over sensory data captured earlier in time. For example, if the period during which sensory data is captured is set to be 2 minutes, but the circular buffer only has capacity to store 30 seconds of sensory data, the first 30-second interval of sensory data is stored in the circular buffer, then overwritten by with the second 30-second interval of sensory data, which is written over by the third 30-second interval of sensory data, which is finally overwritten by the forth 30-second interval of sensory data. This operational feature provides a longer period within which to frame and take a picture, while saving only the most relevant portion of the captured sensory data by referencing the end of the capture period to the image capture operation. This efficiency is apparent by expanding on the preceding example.

Assuming again a circular buffer having the capacity to store 30 seconds of captured sensory data. Setting the period of sensory data capture to begin at the initiating event and end either 2 minutes after the initiating event, or 15 seconds after an image is captured, will result in the latest 30 seconds of sensory data continuously being stored in the circular buffer. If 2 minutes after the initiating event no image has been captured, the last 30 seconds of sensory data will be present in the circular buffer when sensory data capture is terminated. However, if an image is captured within the 2 minutes after the initiation event, the circular buffer will contain 30 seconds of sensory data centered about the time the picture was taken (i.e., 15 seconds after and 15 seconds before, assuming the picture was taken more than 15 seconds after the initiating event). In this way, the period of captured sensory data likely to be most relevant to the captured image is stored (i.e., the period around the time the picture was taken), and the sensory data further away from time of image capture is not saved. A portion of the captured sensory data may be subsequently transferred or copied from the circular buffer to non-volatile storage 108. The actual start and duration of the time period during which sensory data is captured may be user-definable. Instant, or "one-shot," sensory data need not be stored in circular buffer 116.

According to another particular embodiment of the present invention, the period during which sensory data are captured to the circular buffer is user-selectable within a range, for example, 30 to 60 seconds, and the capacity of the circular buffer being some fraction of the range, for example, approximately 15 seconds.

In one embodiment, the event that triggers capture of sensory data is the user composing an image, rather than the user taking an action directly associated with beginning sensory data capture (e.g., a user having to depress a sensory data capture button). Camera functions associated with composing an image include, but are not limited to, framing the picture (telephoto operations), powering up the camera, opening a lens cover, activating a display (e.g., the viewfinder or LCD display), placing the camera viewfinder in close proximity to the user's eye (i.e., eye detection), adjusting camera settings such as focus, zoom, aperture setting, shutter speed, program mode, or other manipulations of a particular camera and typical of framing and/or composing a particular picture for capture may all be used as trigger(s) to initiate capture of audio or other sensory data. These actions may be taken alone or in combination to trigger capture of sensory data. In addition, those actions that trigger sensory data capture may be user configurable.

In yet another embodiment the user is allowed to save either a subset of the extended length sensory data or a default portion thereof. Thus, the sensory data associated with an image is not limited to video scenes and sounds occurring contemporaneously with still image capture, nor limited to video scenes and sounds occurring within a brief period, nor tightly constrained by camera-selected recording intervals. In another embodiment, the camera includes mode selection circuitry that allows the user to choose whether sensory data is captured at all, a default length of sensory data is automatically captured and saved, or an extended length of sensory data is captured.

Figure 2:
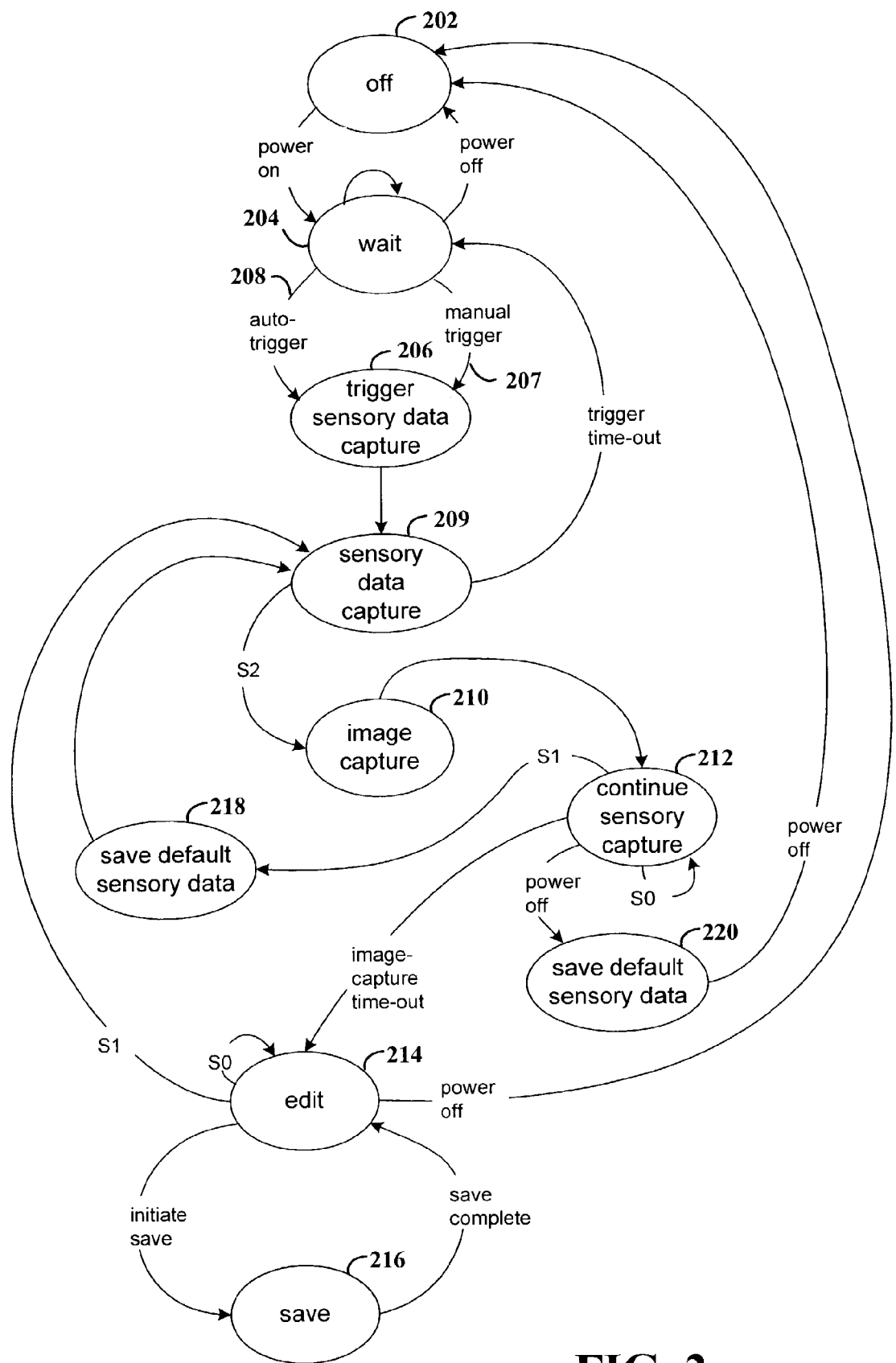
FIG. 2 is a state diagram that illustrates the operational states of a digital still camera while operating in a mode for capture of sensory data in association with an image in accordance with an example embodiment of the invention.

FIG. 2 is a state diagram that illustrates the operational states of a digital camera while operating in a mode for extended capture of sensory data in accordance with an example embodiment of the invention. The ellipses represent operational states of the camera in which the camera performs various functions related to the capture of sensory data. The directional lines that connect the ellipses represent user actions or camera events that cause the camera to transition from one operational state to another. It will be appreciated that the state diagram is not intended as an exhaustive illustration of all possible operational states of a digital camera. Rather, the diagram is intended to illustrate the interplay between certain basic camera operations and the extended sensory data capture mode.

Ellipse 202 represents the powered-down, or "off" state of the camera. Ellipse 204 represents a "wait" state to which the camera transitions when initially powered-up. It will be appreciated that this mode may be a default set by the camera or selected by the user after the camera is turned on. In this operational state, the camera is essentially idle waiting for a user-initiated control.

When the user takes an action that explicitly or implicitly triggers sensory data capture, the camera transitions to state 206. The transition from the wait state 204 may be caused by a manual (explicit) event 207 (e.g., a user depresses an audio record button, or depresses the shutter release button to the S1 position), or by an automatic (implicit) event 208. Those skilled in the art will appreciate that the S0 position is where the shutter release button is not depressed, the S1 position is where the shutter release button is partially depressed (usually engaging autofocus and auto-metering functions if present), and the S2 position is where the shutter release button is fully depressed and still image data are captured. Example automatic triggers include various image composition actions such as detecting a user's eye near the camera's viewfinder, focusing functions, and telephoto adjustments. In another embodiment (not shown), a separate user interface button is provided for initiating capture of sensory data.

Prior to commencing capture of sensory data, the processing/control unit 102 allocates portions of RAM 106 for storage of still image data, and indexes the circular buffer portion of RAM for storage of associated sensory data. The particular method for managing the memory will vary according to implementation requirements. However, it will be appreciated that respective pointers will be established for referencing the memory locations at which the still image data, video data, and sensory (e.g., audio) data are stored.

The camera transitions from state 206 to state 208 according to implementation-specific events. For example, as previously explained, the camera may be configured to wait for a selected period of time after the triggering event occurs to start capturing sensory data. In state 208, the camera begins capturing sensory data (e.g., audio, video, or both). After sensory data capture initiation, the capture of sensory data continues for up to a selected maximum period of time. If the period allocated to capture sensory data times out ("trigger time-out") without a picture being taken, capturing of the sensory data stops and the camera transitions back to the wait state 204.

If the shutter release is moved to S2 (i.e., a picture is taken), the camera transitions to state 210, where image data are captured, capture of sensory data continues, and another timer is started. The image-capture timer is used to control the duration in which sensory data are captured following capture of an image. When the image-capture timer expires ("image-capture time-out), the camera stops capturing sensory data and transitions to state 214 in which the sensory data can be edited.

Figure 3:
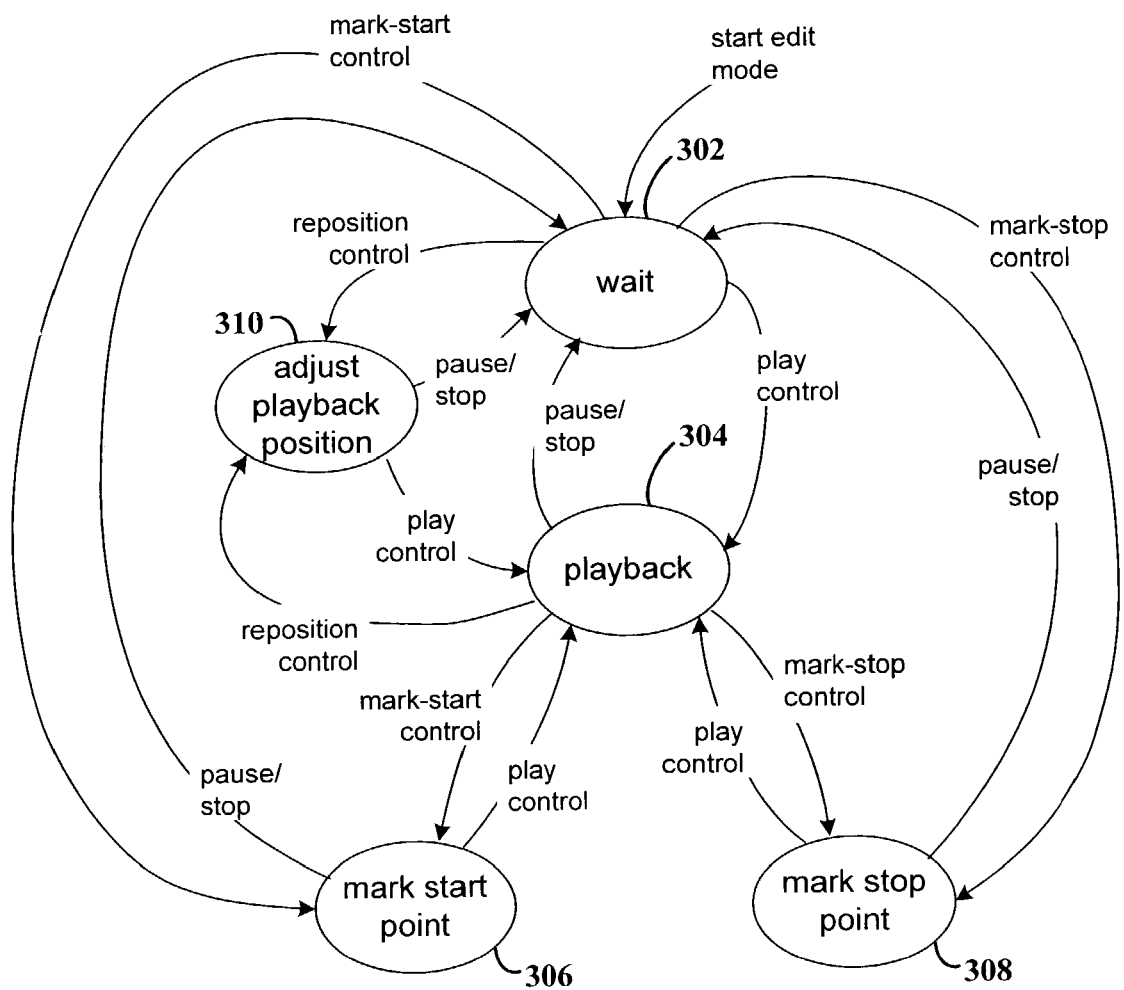
FIG. 3 is a state diagram associated with editing sensory data with a digital still camera.

A default portion of the sensory data from circular buffer 126 is automatically saved in non-volatile storage 108 in association with the image upon entering edit state 214. Based on user controls, a different portion of the sensory data from the circular buffer 126 can be selected. FIG. 3 provides further details for editing sensory data in accordance with an example embodiment. If the user edits the sensory data and issues a save control, the camera transitions to state 216 for saving the user-selected portion of the sensory data from the circular buffer to non-volatile storage 108. Before saving the user-selected portion, a backup copy of the default portion is also made in non-volatile storage 108 so that the default portion can be recovered if the user wants to revert back to the default portion after having already saved the user-selected portion and commenced with further camera operations that have caused the circular buffer to be overwritten. When the user-selected portion has been saved in association with the image, the camera transitions back to state 214. The manner in which the selected portion of sensory data is associated with the still image may be by physical address positions in non-volatile storage 108, by logical pointers to the data, or other data association techniques recognized by those skilled in the art.

If the shutter release is moved to S1 while in edit state 214, the camera transitions back to state 208 where capture of a new segment of sensory data begins.

If in state 212, after capturing image data and continuing capture of sensory data, the shutter release is moved to S1, the camera transitions to state 218 where a default portion of the sensory data from circular buffer 126 is saved in association with the image in non-volatile storage 108. The camera then transitions to state 208 where capture of a new segment of sensory data begins.

If in state 212 a power-off control is initiated, the camera transitions to state 220 where a default portion of the sensory data from circular buffer 126 is saved in association with the image in non-volatile storage 108. The camera returns to power-off state 202.

FIG. 3 is a state diagram associated with an example digital still camera involved in selecting a subset of sensory data ("editing") associated with a still image. Those skilled in the art will appreciate that several alternative control mechanisms are suitable for editing the sensory data, depending on design and implementation requirements. For example, in one embodiment the editing controls include buttons on the camera for playing, pausing, stopping, repositioning a playback cursor, and marking the start point and stop point of the subset of sensory data within the full-length set of sensory data. A visual display in the viewfinder indicates the current playback position, start and stop points, and various other control status messages. It will be appreciated that the editing controls shown in FIG. 3 are applicable to both video and audio data. Depending on design requirements, the video and audio data may be separately editable or editable together.

The nodes of the state diagram indicate a state in editing the sensory data. The transitions between states signify a user-selected editing control function. When the user initiates the mode for editing the sensory data, the camera enters a wait state 302. From the wait state, the next state depends on the user-selected control function. If the user selects the play control function, the camera enters a playback state 304 where the sensory data are played back beginning at the position of the playback cursor. It will be appreciated that upon entering the edit mode the playback cursor is at the beginning of the sensory data.

While in the playback state, the user has the option to mark a starting point or mark an ending point of the subset of sensory data to be saved. These control functions lead to the mark startpoint and mark stop point states 306 and 308, respectively. From each of these states, the user has the option to resume playing the sensory data or pausing or stopping the playback. The pause/stop control returns the camera to the wait state 302. The pause/stop control is also available while in the playback state.

From the wait state and playback state, the user has the option to adjust the position of the playback cursor. Selection of the reposition control function causes the playback cursor to be positioned in the sensory data in the position selected by the user (adjust playback position state 310). If playback is then selected, playback resumes at the position of the playback cursor in playback state 304.

The present invention is believed to be applicable to a variety of arrangements for capturing still image and associated sensory data and has been found to be particularly applicable and beneficial in digital still cameras. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of operating a digital camera, comprising:
    placing the camera into a wait state in response to powering-up the camera;
    detecting manipulation of the camera prior to image-capture;
    wherein the detecting manipulation is performed while the camera is in the wait state and comprises sensing focus adjustments by the camera and sensing activation of a viewfinder display of the digital camera;
    generating sensory data from a sensor signal responsive to detecting manipulation of the camera;
    storing the sensory data in temporary storage;
    generating still image data in response to a control signal to capture a still image, and storing the still image data in non-volatile storage;
    selecting a subset of the sensory data from the temporary storage; and
    storing the subset of the sensory data in non-volatile storage in association with the still image data.

2. The method of claim 1, wherein detecting manipulation comprises sensing a user's eye in proximity to a viewfinder of the digital camera.

3. The method of claim 1, wherein detecting manipulation comprises sensing movement of a lens cover of the digital camera.

4. The method of claim 1, wherein detecting manipulation comprises detecting a shutter-release button of the digital camera at an S1 position.

5. The method of claim 1, wherein the camera includes a lens having an adjustable focal length and detecting manipulation comprises detecting focal length adjustments of the lens.

6. The method of claim 1, wherein the camera is configured with a plurality of program modes, wherein detecting manipulation comprises detecting selection of a program mode.

7. The method of claim 1, wherein the temporary storage is a circular buffer and further comprising ceasing to store the sensory data in the circular buffer after a selected period of time that begins upon detecting manipulation of the camera.

8. The method of claim 1, wherein the sensory data comprises audio data.

9. The method of claim 1, wherein the sensory data comprises video data.

10. The method of claim 1, wherein the sensory data comprises audio data and video data.

11. The method of claim 1, wherein the subset of the sensory data includes all the sensory data in the temporary storage.

12. The method of claim 1, further comprising overwriting the sensory data in temporary storage when sensory data capture commences for another image.

13. The method of claim 1, wherein the subset of the sensory data includes a user-selected subset of the sensory data in the temporary storage.

14. A digital camera, comprising:
    means for detecting manipulation of the camera prior to image-capture
    wherein the means for detecting includes means for sensing focus adjustments by the camera while the camera is powered-up and in a wait state, for sensing activation of a viewfinder display of the digital camera and for generating the trigger signal in response to detection of a focus adjustment;
    means for generating sensory data from a sensor signal responsive to detecting manipulation of the camera;
    means for storing the sensory data in temporary storage;
    means for generating still image data in response to a control signal to capture a still image, and storing the still image data in non-volatile storage;
    means for selecting a subset of the sensory data from the temporary storage; and
    means for storing the subset of the sensory data in non-volatile storage in association with the still image data.

15. A digital camera, comprising:
    a processing unit;
    a detection circuit coupled to the processing unit, the detection circuit configured to generate a trigger signal when the camera is manipulated prior to image-capture;
    wherein the detection circuit is configured to sense focus adjustments by the camera while the camera is powered-up and in a wait state, sense activation of a viewfinder display of the digital camera, and generate the trigger signal in response to detection of a focus adjustment;
    a memory arrangement coupled to the processing unit;
    an image-capture circuit arrangement coupled to the processing unit and configured to capture still image data in response to user control actions;
    a sensory-data-capture circuit arrangement coupled to the processing unit and configured to capture sensory data; and
    wherein the processing unit is configured to initiate capture of sensory data responsive to the trigger signal, temporarily store the sensory data, select a subset of the sensory data, and retentively store the subset of the sensory data in association with the still image data.

16. The camera of claim 15, wherein the detection circuit is configured to sense a user's eye in proximity to a viewfinder of the digital camera.

17. The camera of claim 15, wherein the detection circuit is configured to sense movement of a lens cover of the digital camera.

18. The camera of claim 15, wherein detecting manipulation comprises detecting a shutter-release button of the digital camera at an S1 position.

19. The camera of claim 15, wherein the camera includes a lens having an adjustable focal length and the detection circuit is configured to detect focal length adjustments of the lens.

20. The camera of claim 15, wherein the processing unit is configured with a plurality of program modes, and the detection circuit is configured to detect selection of a program mode.

21. The camera of claim 15, further comprising:
    a circular buffer coupled to the sensory-data-capture circuit arrangement; and
    wherein the processing unit is configured to stop the sensory-data-capture circuit from storing the sensory data in the circular buffer after a selected period of time that begins upon detecting manipulation of the camera.

22. The camera of claim 15, wherein the sensory data comprises audio data.

23. The camera of claim 15, wherein the sensory data comprises video data.

24. The camera of claim 15, wherein the sensory data comprises audio data and video data.

25. The camera of claim 15, wherein the subset of the sensory data includes all the sensory data in the temporary storage.

26. The camera of claim 15, wherein the processing unit is configured to overwrite temporarily stored sensory data responsive to the trigger signal.

27. The camera of claim 15, wherein the subset of the sensory data includes a user-selected subset of the sensory data in the temporary storage.

* * * * *

UNITED STATES PATENT AND TRADEMARK OFFICE
CERTIFICATE OF CORRECTION

| | | |
|---|---|---|
| PATENT NO. | : 7,209,167 B2 | Page 1 of 1 |
| APPLICATION NO. | : 10/342586 | |
| DATED | : April 24, 2007 | |
| INVENTOR(S) | : Pyle et al. | |

It is certified that error appears in the above-identified patent and that said Letters Patent is hereby corrected as shown below:

In the Claims:

Column 9, line 17, in Claim 14 delete "for generating the trigger signal" and replace with --for generating a trigger signal--.

Signed and Sealed this
Fifth Day of April, 2016

Michelle K. Lee
*Director of the United States Patent and Trademark Office*